(12) United States Patent
Yeh

(10) Patent No.: US 11,747,932 B2
(45) Date of Patent: Sep. 5, 2023

(54) TOUCH DETECTING CIRCUIT

(71) Applicant: SITRONIX TECHNOLOGY CORP., Jhubei (TW)

(72) Inventor: Cheng-Chung Yeh, Jhubei (TW)

(73) Assignee: Sitronix Technology Corp, Jhubei (TW)

( * ) Notice: Subject to any disclaimer, the term of this patent is extended or adjusted under 35 U.S.C. 154(b) by 0 days.

(21) Appl. No.: 17/137,890

(22) Filed: Dec. 30, 2020

(65) Prior Publication Data
US 2022/0066590 A1 Mar. 3, 2022

Related U.S. Application Data

(60) Provisional application No. 62/954,678, filed on Dec. 30, 2019.

(51) Int. Cl.
*G06F 3/041* (2006.01)
*G06F 3/044* (2006.01)

(52) U.S. Cl.
CPC ................... *G06F 3/0416* (2013.01)

(58) Field of Classification Search
USPC .......................................... 345/173
See application file for complete search history.

(56) References Cited

U.S. PATENT DOCUMENTS

| | | | | |
|---|---|---|---|---|
| 9,164,641 B1* | 10/2015 | Rowe | ..................... | G06F 3/0443 |
| 2010/0238122 A1* | 9/2010 | Chang | .................. | G06F 3/0412 |
| | | | | 345/173 |
| 2010/0253638 A1* | 10/2010 | Yousefpor | ............. | G06F 3/0443 |
| | | | | 345/173 |
| 2011/0102361 A1* | 5/2011 | Philipp | ............... | G02F 1/13439 |
| | | | | 345/174 |
| 2011/0109568 A1* | 5/2011 | Wu | ........................ | G06F 3/0443 |
| | | | | 345/173 |
| 2012/0169636 A1* | 7/2012 | Liu | ........................ | G06F 3/0445 |
| | | | | 345/173 |
| 2013/0265244 A1* | 10/2013 | Kim | ....................... | G06F 3/0448 |
| | | | | 345/173 |
| 2015/0205427 A1* | 7/2015 | Wu | ........................ | G06F 3/0446 |
| | | | | 345/174 |
| 2015/0346860 A1* | 12/2015 | Qin | ..................... | G06F 3/04166 |
| | | | | 345/174 |
| 2016/0259475 A1* | 9/2016 | Nakamura | .......... | G06F 3/04184 |
| 2016/0291782 A1* | 10/2016 | Zhai | .................... | G06F 3/04164 |

(Continued)

FOREIGN PATENT DOCUMENTS

| | | |
|---|---|---|
| CN | 106648189 A | 5/2017 |
| TW | 201911276 A | 3/2019 |

*Primary Examiner* — Chineyere D Wills-Burns
(74) *Attorney, Agent, or Firm* — Rosenberg, Klein & Lee

(57) ABSTRACT

The present invention relates to a touch detecting circuit, which comprises a touch driving circuit and a touch sensing circuit. The touch driving circuit generates a touch driving signal and provides it to at least one common electrode of a panel. The touch sensing circuit receives a plurality of sensing signals via a plurality of source lines or/and a plurality of gate lines of the panel for detecting the touch location. The sensing signals are generated corresponding to the touch driving signal. In addition, the touch driving circuit may provide the touch driving signal to the source lines. The touch sensing circuit receives the sensing signals via the gate lines for detecting the touch location.

25 Claims, 9 Drawing Sheets

(56) References Cited

U.S. PATENT DOCUMENTS

| | | | |
|---|---|---|---|
| 2017/0060295 A1* | 3/2017 | He | G06F 3/04182 |
| 2017/0123529 A1* | 5/2017 | Ho | G06F 3/0416 |
| 2017/0242529 A1* | 8/2017 | Park | G09G 3/20 |
| 2017/0277326 A1* | 9/2017 | Cao | H01L 27/1259 |
| 2018/0113531 A1* | 4/2018 | Na | G06F 3/0412 |
| 2019/0018542 A1* | 1/2019 | Cheng | G06F 3/0416 |
| 2019/0042055 A1* | 2/2019 | Hu | G06F 3/0418 |
| 2019/0339557 A1* | 11/2019 | Tominaga | G02F 1/13338 |
| 2020/0174606 A1* | 6/2020 | Wang | G06F 3/04166 |

* cited by examiner

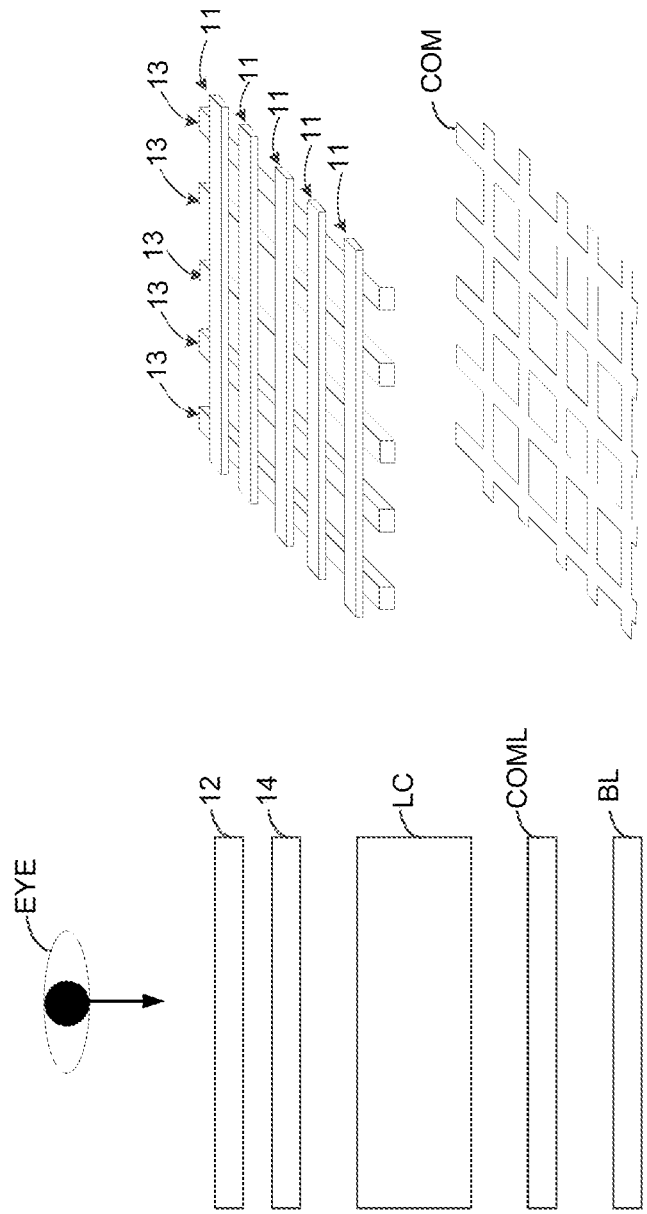

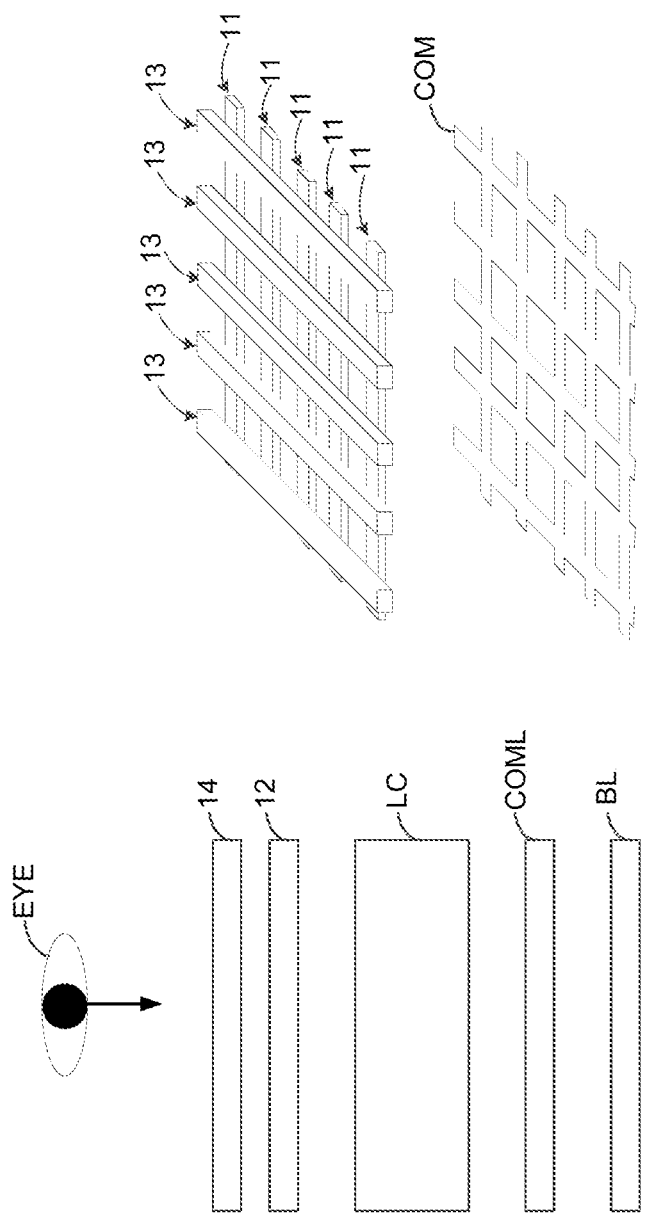

TOUCH DETECTING CIRCUIT

FIELD OF THE INVENTION

The present invention relates generally to a detecting circuit, and particularly to a touch detecting circuit.

BACKGROUND OF THE INVENTION

Given the environment of huge applications of touch panels and mature technologies, the considerations in production procedures and costs have become more important, leading to appearance of embedded touch panels (on-cell or in-cell) or hybrid in-cell touch panels. No matter which technology according to the prior art is adopted, touch sensors and extra touch wiring should be manufactured additionally, which complicates the process, lowers the production yield, and increases the costs.

Accordingly, the current task is to simply touch detection by avoiding additional fabrication of touch sensor and extra touch wiring.

SUMMARY

An objective of the present invention is to provide a touch detecting circuit, which uses the common electrode of a panel as the touch driving line and the gate lines and the source lines of the panel as the touch sensing lines. Thereby, by avoiding additional fabrication of touch sensors and touch wiring, the touch detecting architecture may be simplified, the complexity may be lowered, and the costs may be saved.

Another objective of the present invention is to provide a touch detecting circuit, which uses the source lines of a panel as the touch driving line and the gate lines of the panel as the touch sensing lines. Thereby, by avoiding additional fabrication of touch sensors and touch wiring, the touch detecting architecture may be simplified, the complexity may be lowered, and the costs may be saved.

The present invention discloses a touch detecting circuit, which comprises a touch driving circuit and a touch sensing circuit. The touch driving circuit generates a touch driving signal and provides it to at least one common electrode of a panel. The touch sensing circuit receives a plurality of source sensing signals via a plurality of source lines of the panel for detecting the touch location. The source sensing signals are generated corresponding to the touch driving signal.

The present invention discloses another touch detecting circuit, which comprises a touch driving circuit and a touch sensing circuit. The touch driving circuit generates a touch driving signal and provides it to a plurality of source-line groups of a panel with each source-line group including at least one source line. The touch sensing circuit receives a plurality of gate sensing signals via a plurality of gate lines of the panel for detecting the touch location. The gate sensing signals are generated corresponding to the touch driving signal.

BRIEF DESCRIPTION OF THE DRAWINGS

FIG. 8A shows a cross-sectional view of the panel according to the first embodiment of the present invention;

FIG. 8B shows a stereoscopic view of the panel according to the first embodiment of the present invention;

FIG. 9A shows a cross-sectional view of the panel according to the second embodiment of the present invention; and FIG. 9B shows a stereoscopic view of the panel according to the second embodiment of the present invention.

DETAILED DESCRIPTION

In the specifications and subsequent claims, certain words are used for representing specific elements. A person having ordinary skill in the art should know that hardware manufacturers might use different nouns to call the same elements. In the specifications and subsequent claims, the differences in names are not used for distinguishing elements. Instead, the differences in functions are the guidelines for distinguishing. In the whole specifications and subsequent claims, the word "comprising/including" is an open language and should be explained as "comprising/including but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

Figure 1:
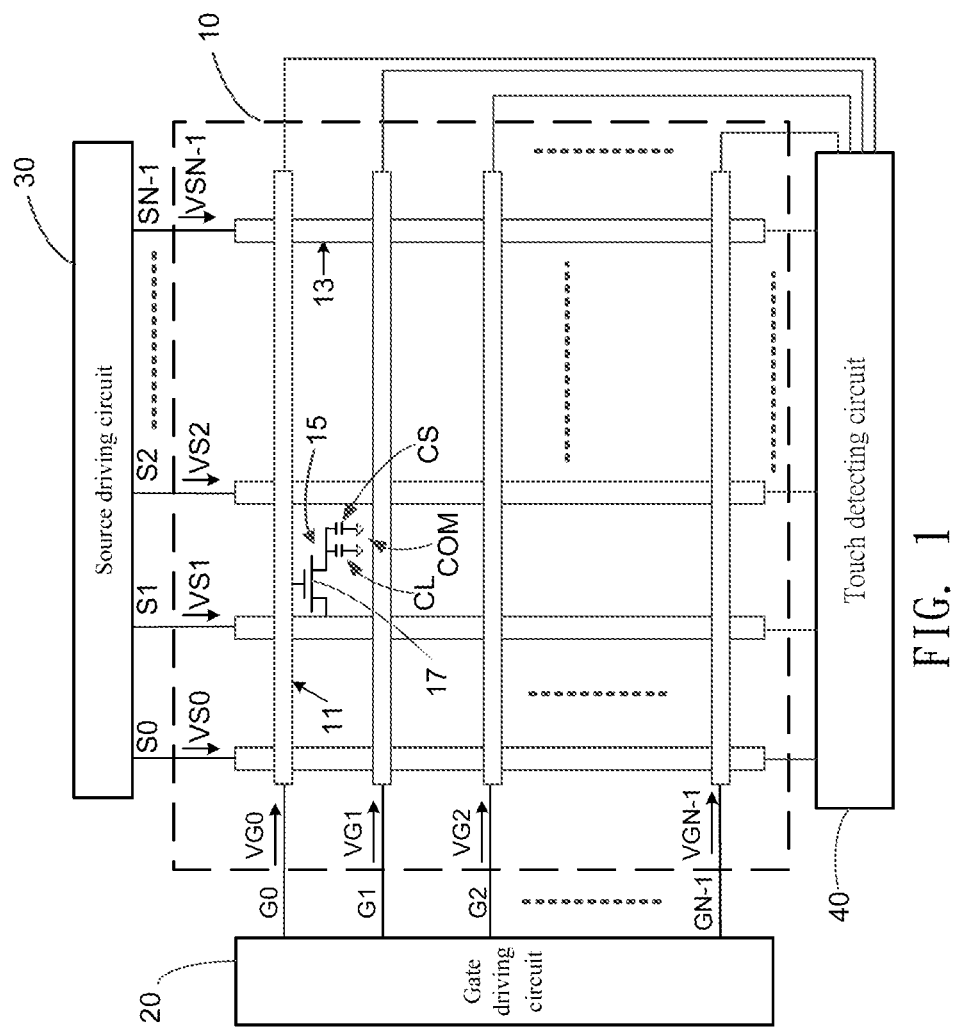
FIG. 1 shows a schematic diagram of the touch module according to an embodiment of the present invention.

Please refer to FIG. 1, which shows a schematic diagram of the touch module according to an embodiment of the present invention. As shown in the figure, the touch module according to the present invention comprises a panel 10, a gate driving circuit 20, a source driving circuit 30, and a touch detecting circuit 40. The panel 10 includes a plurality of gate lines 11 (G0~GN−1), a plurality of source lines 13 (S0~SN−1), and a plurality of pixels 15. The gate lines 11 and the source lines 13 are interlaced. The pixels 15 are located at the intersections. Each pixel 15 includes a transistor 17, a liquid-crystal capacitor CL, and a storage capacitor CS. The gate and the source of the transistor 17 are coupled to the gate line 11 and the source line 13. The drain of the transistor 17 is coupled to one terminal of the liquid-crystal capacitor CL and one terminal of the storage capacitor CS. The other terminal of the liquid-crystal capacitor CL is coupled to a common electrode COM. The other terminal of the storage capacitor CS is coupled to the common electrode COM or a ground.

The gate driving circuit 20 is coupled to the gate lines 11 and outputs a plurality of gate signals VG0~VGN−1 to the gate lines 11. The gate lines 11 transmit the gate signals VG0~VGN−1 to the gates of the transistors 17 in the pixels 15 on each row, respectively, for controlling the transistors 17 of the pixels 15. The source driving circuit 30 is coupled to the source lines 21 and outputs a plurality of source signals VS0~VSN−1 to the sources of the transistors 17 in the pixels 15 on each column for charging the liquid-crystal capacitors CL of the pixels 15 and driving the pixels 15 to display images. The touch detecting circuit 40 is coupled to the gate lines 11, the source lines 13, and the common electrode COM for detecting the touch location. The touch detecting circuit 40 detects the touch location by using the methods to be described in the following embodiments.

Figure 2:
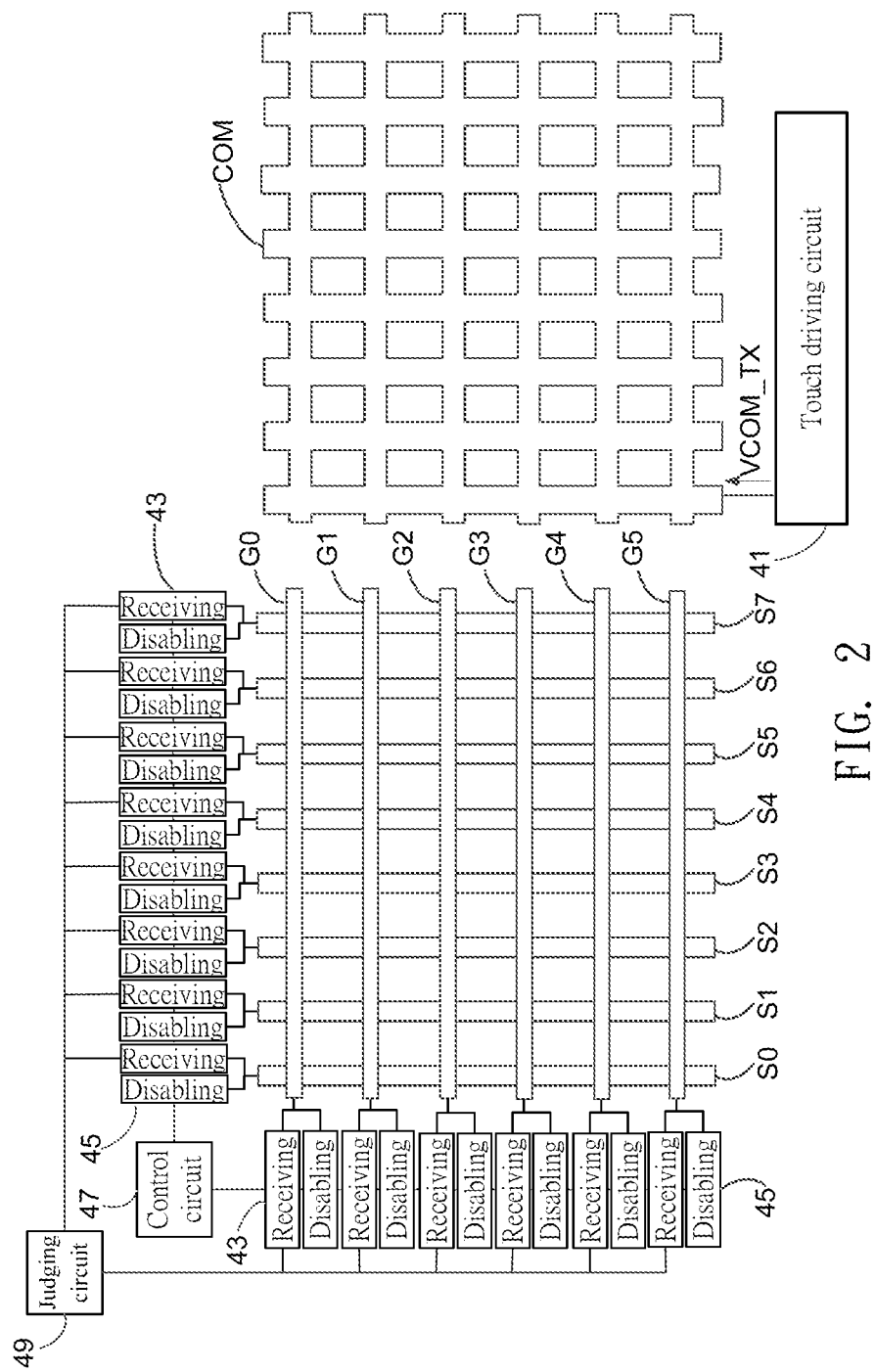
FIG. 2 shows a circuit diagram of the touch detecting circuit according to the first embodiment of the present invention.

Please refer to FIG. 2, which shows a circuit diagram of the touch detecting circuit according to the first embodiment of the present invention. As shown in the figure, the touch detecting circuit comprises a touch driving circuit 41 and a touch sensing circuit. The touch driving circuit 41 is coupled to the common electrode COM of the panel and generates a touch driving signal VCOM_TX to the common electrode COM. The touch driving signal VCOM_TX may include at least one pulse.

According to an embodiment of the present invention, the panel only includes a single common electrode COM corresponding to all pixels 15. According to an embodiment of the present invention, the touch driving circuit 41 may be a common-voltage generating circuit, which generates the touch driving signal VCOM_TX to the common electrode COM during a touch detecting period and a display common voltage VCOM_DSP to the common electrode COM during a display period for working with the source signals VS0~VSN−1 to drive the pixels 15 to display images.

According to the present embodiment, six gate lines G0~G5 and eight source lines S0~S7 are adopted. Nonetheless, the present invention is not limited to the embodiment. The touch sensing circuit includes a plurality of receiving circuits 43 and a plurality disabling circuits 45 coupled to the gate lines G0~G5 and the source lines S0~S7, respectively. According to an embodiment of the present invention, each of the gate lines G0~G5 and each of the source lines S0~S7 are coupled to a receiving circuit 43 and a disabling circuit 45, respectively. Namely, the touch sensing circuit is coupled to the gate lines G0~G5 and the source lines S0~S7. The receiving circuits 43 coupled to the gate lines G0~G5 receive a plurality of gate sensing signals via the gate lines G0~G5; the receiving circuits 43 coupled to the source lines S0~S7 receive a plurality of source sensing signals via the source lines S0~S7. The gate sensing signals and the source sensing signals are generated via the liquid-crystal capacitors CL (as shown in FIG. 1) and the coupling capacitors between the gate lines G0~G5/the source lines S0~S7 and the common electrode COM by corresponding to the touch driving signal VCOM_TX. As shown in FIG. 1, since the liquid-crystal capacitor CL is coupled between the transistor 17 and the common electrode COM and the capacitance of the liquid-crystal capacitor CL is much higher than the capacitance of coupling capacitors between wires, while providing the touch driving signal VCOM_TX to the common electrode COM, the intensity of the gate sensing signals and the source sensing signals generated by corresponding to the touch driving signal VCOM_TX via the liquid-crystal capacitor CL is large. Thereby, the accuracy in sensing and judging the gate sensing signals and the source sensing signals may be increased. The level of the source sensing signals will be different depending on whether the source lines are touched. Likewise, the level of the gate sensing signals will differ depending on whether the gate lines are touched.

Please refer again to FIG. 2. The disabling circuits 45 are used for disabling the gate lines G0~G5 and the source lines S0~S7 and driving at least one gate line G0~G5 or/and at least one source line S0~S7 to be in a disabled state without the gate sensing signal or/and the source sensing signal. According to an embodiment of the present invention, the disabling circuit 45 provides a direct-current level to at least one gate line G0~G5 or/and at least one source line S0~S7. This direct-current level includes a ground level for driving the coupling capacitors between the common electrode COM and the gate lines G0~G5/the source lines S0~S7 and the liquid-crystal capacitors CL not to generate the gate sensing signal/source sensing signal. In addition, the disabling circuit 45 may drive the impedance of at least one gate line G0~G5 or/and at least one source line S0~S7 to be high and thus making them in the floating state. This method may also drive the coupling capacitors between the common electrode COM and the gate lines G0~G5/the source lines S0~S7 and the liquid-crystal capacitors CL not to generate the gate sensing signal/the source sensing signal. According to an embodiment of the present invention, the disabling circuits 45 may be integrated to a single disabling circuit capable of selectively disabling at least one gate line G0~G5 or/and at least one source line S0~S7. The touch sensing circuit according to the present invention may further include a control circuit 47 coupled to the receiving circuits 43 and the disabling circuits 45 for controlling their operations. Besides, the touch detecting circuit may further comprise a judging circuit 49 coupled to the receiving circuits 43, receiving the gate sensing signals and the source sensing signals, and judging the touch location according to the gate sensing signals and the source sensing signals. The touch driving circuit 41, the touch sensing circuit, and the judging circuit 49 may be integrated on a single chip. Nonetheless, the present invention is not limited to the embodiment. For example, the judging circuit 49 may be located in a main host, such as the microprocessor of an electronic device.

Figure 3:
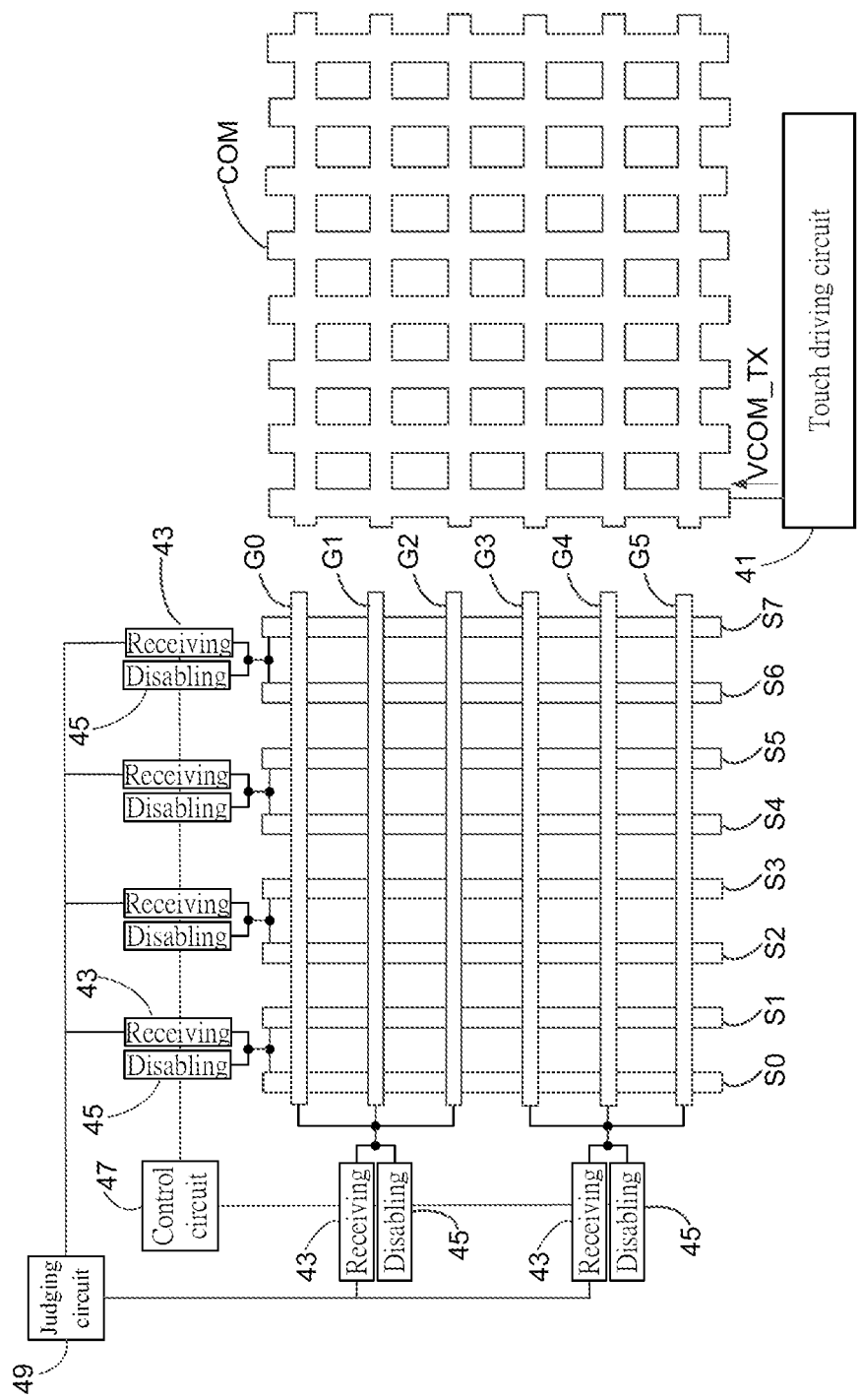
FIG. 3 shows a circuit diagram of the touch detecting circuit according to the second embodiment of the present invention.

Please refer to FIG. 3, which shows a circuit diagram of the touch detecting circuit according to the second embodiment of the present invention. As shown in the figure, the difference between the present embodiment and the one in FIG. 2 is that according to the present embodiment, the gate lines G0~G5 are grouped into a plurality of gate-line groups, including a first gate-line group and a second gate-line group. The first gate-line group includes the gate lines G0~G2 while the second gate-line group includes the gate lines G3~G5. According to the present embodiment, three gate lines are grouped into a gate-line group. Nonetheless, the present invention is not limited to the embodiment. In addition, the source lines S0~S7 are grouped into a plurality of source-line groups, including a first, a second, a third, and a fourth source-line group. The first source-line group includes the source lines S0~S1; the second source-line group includes the source lines S2~S3; the third source-line group includes the source lines S4~S5; and the fourth source-line group includes the source lines S6~S7. According to the present embodiment, two source lines are grouped into a source-line group. Nonetheless, the present invention is not limited to the embodiment. Each gate-line group and each source-line group are coupled to a receiving circuit 43 and a disabling circuit 45, respectively, for reducing the amount of the receiving circuits 43 and the disabling circuits 45 as well as increasing the coupling area with the common electrode COM for improving the intensity of the sensing signals. According to the embodiment in FIG. 2, one gate line is grouped into a gate-line group and one source line is grouped into a source-line group.

In the following, the embodiment in FIG. 2 is used to describe the method for detecting the touch location by the touch detecting circuit. First, the touch driving circuit 41 provides the touch driving signal VCOM_TX to the common electrode COM. The control circuit 47 controls the receiving circuit 43 coupled to the first source-line group (the source lines S0~S1) to receive the first source sensing signal via the first source-line group and transmit the first source sensing signal to the judging circuit 49. Meanwhile, the control circuit 47 controls the disabling circuits 45 coupled to the second (the source lines S2~S3), the third (the source lines S4~S5), and the fourth source-line group (the source lines S6~S7) to disable the second, the third, and the fourth source-line group. The control circuit 47 also controls the disabling circuits 45 coupled to the first (the gate lines G0~G2) and the second gate-line group (the gate lines G3~G5) to disable the first and second gate-line group. Afterwards, the touch driving circuit 41 provides the touch driving signal VCOM_TX to the common electrode COM. The control circuit 47 controls the receiving circuit 43 coupled to the second source-line group to receive the second source sensing signal via the second source-line group and transmit the second source sensing signal to the judging circuit 49. Meanwhile, the control circuit 47 controls the disabling circuits 45 coupled to the first, the third, and the fourth source-line group to disable the first, the third, and the fourth source-line group. The first and the second gate-line group are maintained in the disabled state. Then, the touch driving circuit 41 provides the touch driving signal VCOM_TX to the common electrode COM. The control circuit 47 controls the receiving circuit 43 coupled to the third source-line group to receive the third source sensing signal via the third source-line group and transmit the third source sensing signal to the judging circuit 49. Meanwhile, the control circuit 47 controls the disabling circuits 45 coupled to the first, the second, and the fourth source-line group to disable the first, the second, and the fourth source-line group. The first and the second gate-line group are maintained in the disabled state. Next, the touch driving circuit 41 provides the touch driving signal VCOM_TX to the common electrode COM. The control circuit 47 controls the receiving circuit 43 coupled to the fourth source-line group to receive the fourth source sensing signal via the fourth source-line group and transmit the fourth source sensing signal to the judging circuit 49. Meanwhile, the control circuit 47 controls the disabling circuits 45 coupled to the first, the second, and the third source-line group to disable the first, the second, and the third source-line group. The first and the second gate-line group are maintained in the disabled state. Thereby, the judging circuit 49 may judge and locate which source-line groups are touched and hence positioning the first directional dimension of the touch.

Next, the touch driving circuit 41 provides the touch driving signal VCOM_TX to the common electrode COM. The control circuit 47 controls the receiving circuit 43 coupled to the first gate-line group to receive the first gate sensing signal via the first gate-line group and transmit the first gate sensing signal to the judging circuit 49. Meanwhile, the control circuit 47 controls the disabling circuit 45 coupled to the second gate-line group to disable the second gate-line group. The control circuit 47 also controls the disabling circuits 45 coupled to the first to the fourth source-line groups to disable the first to the fourth source-line groups. Afterwards, the touch driving circuit 41 provides the touch driving signal VCOM_TX to the common electrode COM. The control circuit 47 controls the receiving circuit 43 coupled to the second gate-line group to receive the second gate sensing signal via the second gate-line group and transmit the second gate sensing signal to the judging circuit 49. Meanwhile, the control circuit 47 controls the disabling circuit 45 coupled to the first gate-line group to disable the first gate-line group. The first to the fourth source-line groups are maintained in the disabled state. Thereby, the judging circuit 49 may judge and locate which gate-line groups are touched and hence positioning the second directional dimension of the touch. According to an embodiment, multiple source sensing signals may be received by multiple source-line groups concurrently or multiple gate sensing signals may be received by multiple gate-line groups concurrently.

Moreover, to locate the touch location precisely, the following steps may be further executed according to the touched source-line groups and the touched gate-line groups judged as described above. Assume that the first source-line group, the third source-line group, the first gate-line group, and the second gate-line group are touched. The touch driving circuit 41 provides the touch driving signal VCOM_TX to the common electrode COM. The control circuit 47 controls the receiving circuit 43 coupled to the first source-line group to receive the first source sensing signal via the first source-line group and transmit the first source sensing signal to the judging circuit 49. Meanwhile, the control circuit 47 also controls the receiving circuit 43 coupled to the first gate-line group to receive the first gate sensing signal via the first gate-line group and transmit the first gate sensing signal to the judging circuit 49. The rest source-line group and the rest gate-line group are in the disabled state. If the judging circuit 49 judges that the level of the first source sensing signal and the level of the first gate sensing signal are touch levels, it means that the intersection of the first source-line group and the first gate-line group is a true touched region. Afterwards, the control circuit 47 controls the receiving circuit 43 coupled to the first source-line group to receive the first source sensing signal via the first source-line group. Meanwhile, the control circuit 47 also controls the receiving circuit 43 coupled to the second gate-line group to receive the second gate sensing signal via the second gate-line group. The rest source-line group and the rest gate-line group are in the disabled state. Then, the control circuit 47 controls the receiving circuit 43 coupled to the third source-line group to receive the third source sensing signal via the third source-line group. Meanwhile, the control circuit 47 also controls the receiving circuit 43 coupled to the first gate-line group to receive the first gate sensing signal via the first gate-line group. The rest source-line group and the rest gate-line group are in the disabled state. Finally, the control circuit 47 controls the receiving circuit 43 coupled to the third source-line group to receive the third source sensing signal via the third source-line group. Meanwhile, the control circuit 47 also controls the receiving circuit 43 coupled to the second gate-line group to receive the second gate sensing signal via the second gate-line group. The rest source-line group and the rest gate-line group are in the disabled state. Thereby, the judging circuit 49 may judge all true touched regions.

In the following, the embodiment in FIG. 2 is used to describe another method by which the touch detecting circuit detects the touch location. The touch driving circuit 41 provides the touch driving signal VCOM_TX to the common electrode COM. The control circuit 47 controls the receiving circuit 43 coupled to the first source-line group to receive the first source sensing signal via the first source-line group and transmit the first source sensing signal to the judging circuit 49. Meanwhile, the control circuit 47 also controls the receiving circuit 43 coupled to the first gate-line group to receive the first gate sensing signal via the first gate-line group and transmit the first gate sensing signal to the judging circuit 49. The rest source-line groups and the rest gate-line group are in the disabled state. Afterwards, the touch driving circuit 41 provides the touch driving signal VCOM_TX to the common electrode COM. The control circuit 47 controls the receiving circuit 43 coupled to the first source-line group to receive the first source sensing signal via the first source-line group and transmit the first source sensing signal to the judging circuit 49. Meanwhile, the control circuit 47 also controls the receiving circuit 43 coupled to the second gate-line group to receive the second gate sensing signal via the second gate-line group and transmit the second gate sensing signal to the judging circuit 49. The rest source-line groups and the rest gate-line group are in the disabled state. Then, the touch driving circuit 41 provides the touch driving signal VCOM_TX to the common electrode COM. The control circuit 47 controls the receiving circuit 43 coupled to the second source-line group to receive the second source sensing signal via the second source-line group and transmit the second source sensing signal to the judging circuit 49. Meanwhile, the control circuit 47 also controls the receiving circuit 43 coupled to the first gate-line group to receive the first gate sensing signal via the first gate-line group and transmit the first gate sensing signal to the judging circuit 49. The rest source-line groups and the rest gate-line group are in the disabled state. Then, the touch driving circuit 41 provides the touch driving signal VCOM_TX to the common electrode COM. The control circuit 47 controls the receiving circuit 43 coupled to the second source-line group to receive the second source sensing signal via the second source-line group and transmit the second source sensing signal to the judging circuit 49. Meanwhile, the control circuit 47 also controls the receiving circuit 43 coupled to the second gate-line group to receive the second gate sensing signal via the second gate-line group and transmit the second gate sensing signal to the judging circuit 49. The rest source-line groups and the rest gate-line group are in the disabled state. Likewise, the third source sensing signal and the first gate sensing signal are received via the third source-line group and the first gate-line group concurrently. Afterwards, the third source sensing signal and the second gate sensing signal are received via the third source-line group and the second gate-line group concurrently. Then, the fourth source sensing signal and the first gate sensing signal are received via the fourth source-line group and the first gate-line group concurrently. Finally, the fourth source sensing signal and the second gate sensing signal are received via the fourth source-line group and the second gate-line group concurrently.

Figure 4:
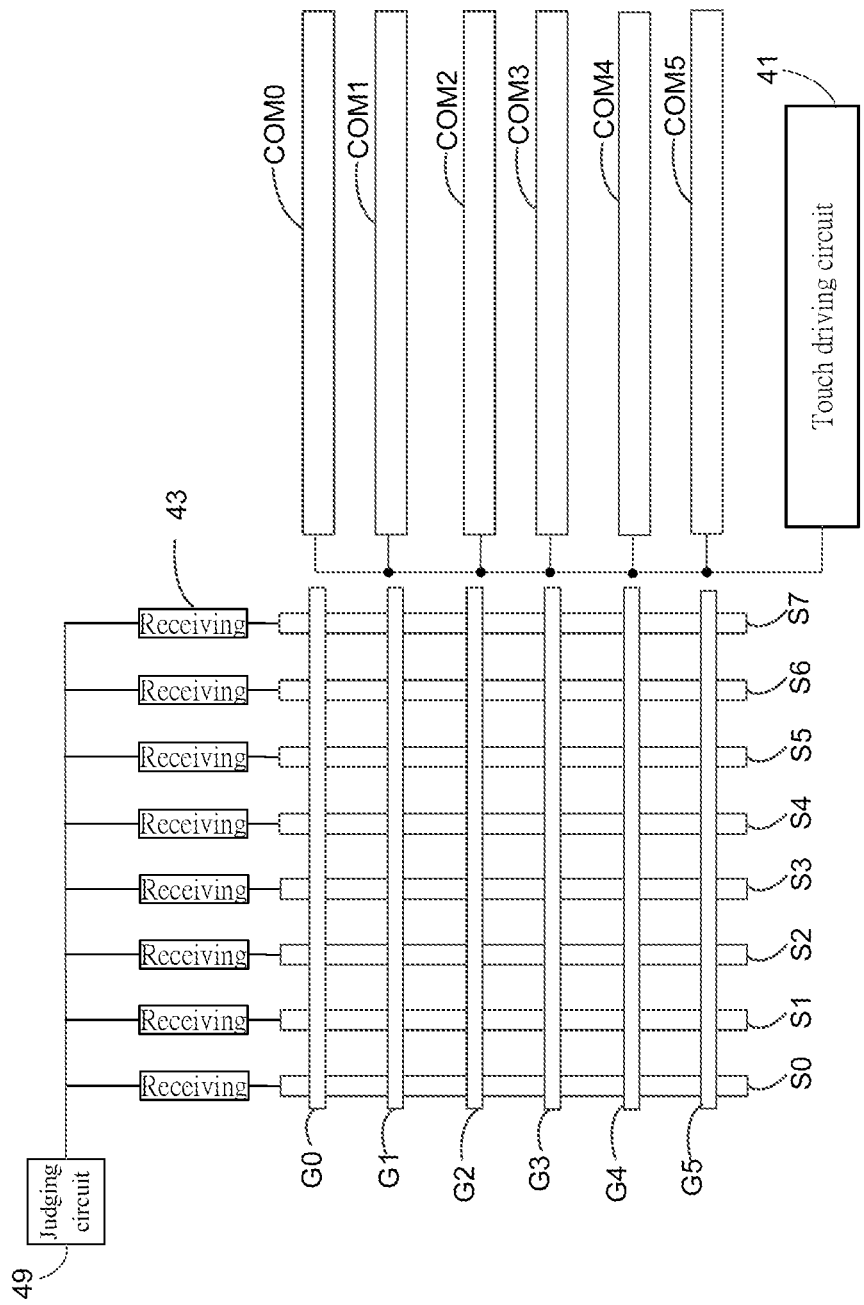
FIG. 4 shows a circuit diagram of the touch detecting circuit according to the third embodiment of the present invention.

Please refer to FIG. 4, which shows a circuit diagram of the touch detecting circuit according to the third embodiment of the present invention. As shown in the figure, the present embodiment includes a plurality of common electrodes COM0~COM5, which is different from the embodiment in FIG. 1 including a single common electrode COM only. The common electrodes COM0~COM5 are interlaced with the source lines S0~S7. The touch driving circuit 41 is coupled to the common electrodes COM0~COM5 for providing the touch driving signal VCOM_TX to the common electrodes COM0~COM5 or disabling at least one the common electrodes COM0~COM5. Like the disabling circuit 45, the touch driving circuit 41 may supply a direct-current level to at least one the common electrodes COM0~COM5 or drive at least one the common electrodes COM0~COM5 to be floating for disabling at least one the common electrodes COM0~COM5. In addition, the gate lines G0~G5 according to the present embodiment are not coupled to the receiving circuits 43 and the disabling circuits 45. The amount of the common electrodes is determined according to the usage requirements and not limited to a specific number.

Figure 5:
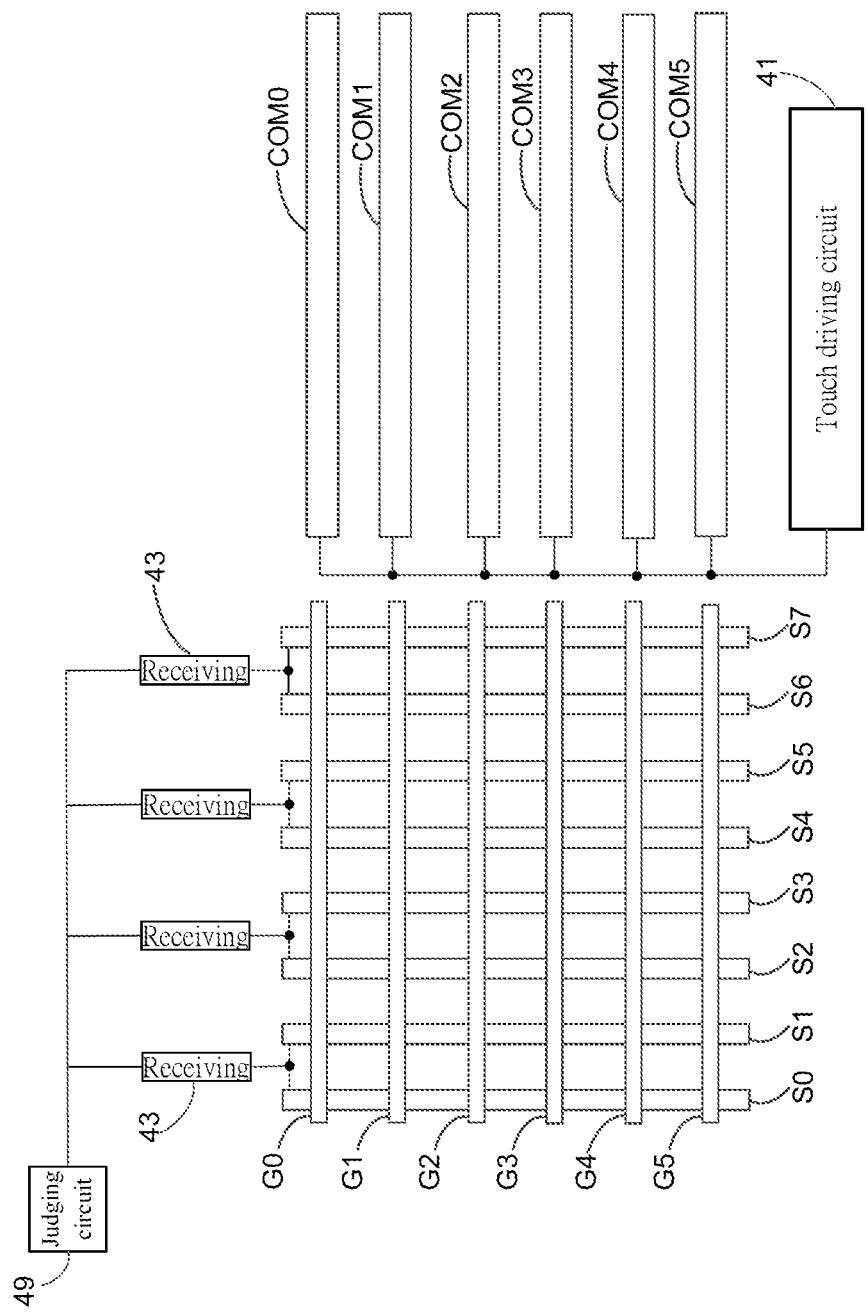
FIG. 5 shows a circuit diagram of the touch detecting circuit according to the fourth embodiment of the present invention.

Please refer to FIG. 5, which shows a circuit diagram of the touch detecting circuit according to the fourth embodiment of the present invention. As shown in the figure, the difference between the present embodiment and the one in FIG. 3 is that the present embodiment includes a plurality of common electrodes COM0~COM5, which is different from the embodiment in FIG. 3 including a single common electrode COM only. In addition, the gate lines G0~G5 according to the present embodiment are not coupled to the receiving circuits 43 and the disabling circuits 45.

In the following, the embodiment in FIG. 5 is used to describe another method by which the touch detecting circuit detects the touch location. The touch driving circuit 41 provides the touch driving signal VCOM_TX to the first common electrode COM0 and disables the second to the sixth common electrodes COM1~COM5. The control circuit 47 controls the receiving circuits 43 coupled to the first to the fourth source-line groups to receive the first to the fourth source sensing signals via the first to the fourth source-line groups and transmit the first to the fourth source sensing signals to the judging circuit 49 for judging if the true touched region is the intersection of the first common electrode COM0 and the first to the fourth source-line groups. Next, the touch driving circuit 41 provides the touch driving signal VCOM_TX to the second common electrode COM1 and disables the first common electrode COM0 and the third to the sixth common electrodes COM2~COM5. The control circuit 47 controls the receiving circuits 43 coupled to the first to the fourth source-line groups to receive the first to the fourth source sensing signals via the first to the fourth source-line groups and transmit the first to the fourth source sensing signals to the judging circuit 49. Likewise, the touch driving circuit 41 provides the touch driving signal VCOM_TX to the third common electrode COM2 and disables the first to the second common electrodes COM0~COM1 and the fourth to the sixth common electrodes COM3~COM5. Then the first to the fourth source sensing signals are received via the first to the fourth source-line groups. Afterwards, the touch driving circuit 41 provides the touch driving signal VCOM_TX to the fourth common electrode COM3 and disables the first to the third common electrodes COM0~COM2 and the fifth to the sixth common electrodes COM4~COM5. Then the first to the fourth source sensing signals are received via the first to the fourth source-line groups. Then, the touch driving circuit 41 provides the touch driving signal VCOM_TX to the fifth common electrode COM4 and disables the first to the fourth common electrodes COM0~COM3 and the sixth common electrodes COM5. Then the first to the fourth source sensing signals are received via the first to the fourth source-line groups. Finally, the touch driving circuit 41 provides the touch driving signal VCOM_TX to the sixth common electrode COM5 and disables the first to the fifth common electrodes COM0~COM4. Then the first to the fourth source sensing signals are received via the first to the fourth source-line groups. The order of providing the touch driving signal VCOM_TX to the common electrodes COM0~COM5 as described above is only an embodiment of the present invention. The order is not limited to the above one and may be determined according to the requirements.

Furthermore, according to another embodiment of the present invention, the common electrodes COM0~COM5 may be interlaced with the gate lines and the gate lines may be used as the touch sensing lines. Thereby, the above methods may be used to detect the touch location.

Figure 6:
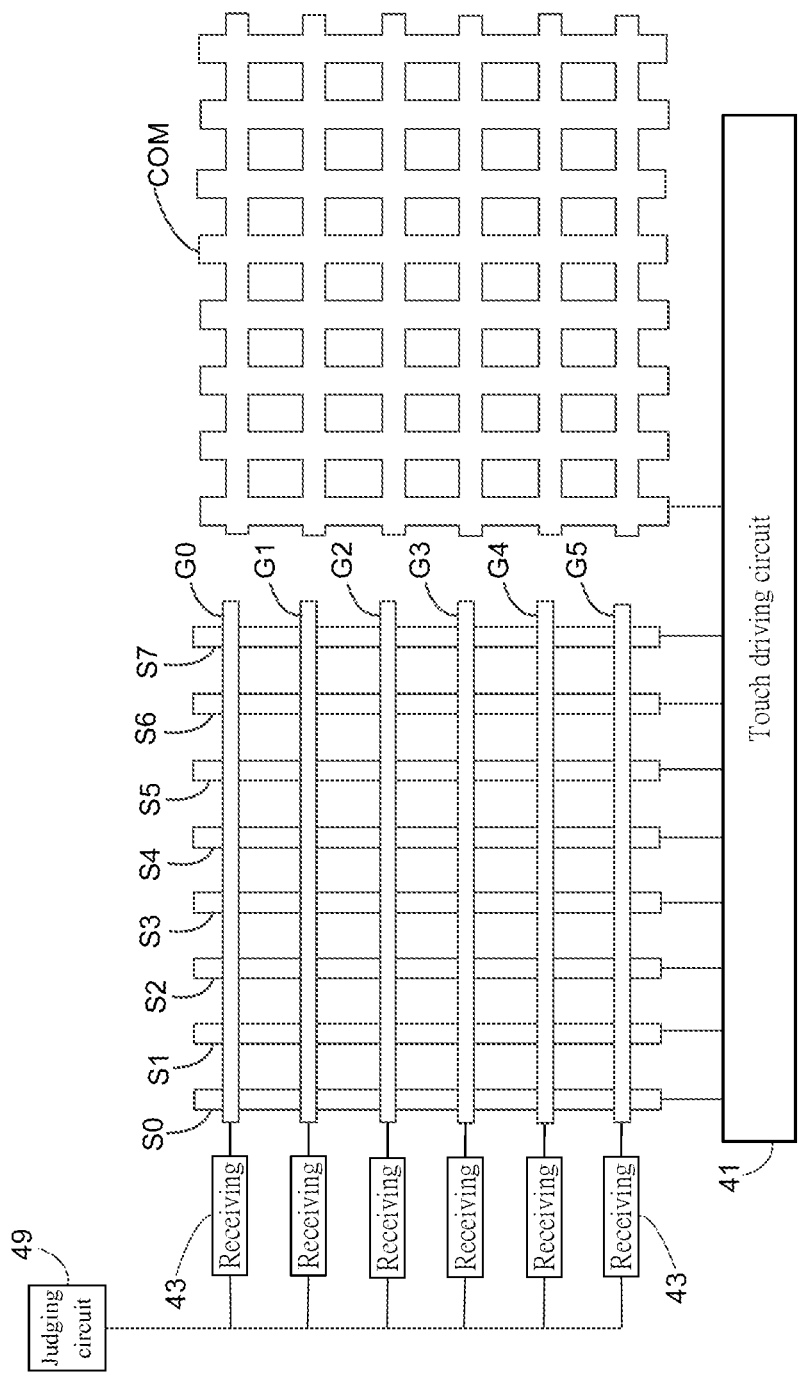
FIG. 6 shows a circuit diagram of the touch detecting circuit according to the fifth embodiment of the present invention.

Please refer to FIG. 6, which shows a circuit diagram of the touch detecting circuit according to the fifth embodiment of the present invention. As shown in the figure, the touch driving circuit 41 is coupled to the source lines S0~S7 and the common electrode COM, and the source lines S0~S7 are not coupled to the receiving circuit 43. According to the present embodiment, the source lines S0~S7 are used as the touch driving lines while the gate lines G0~G5 are used as the touch sensing lines. The touch driving circuit 41 provides the touch driving signal VCOM_TX to the source lines S0~S7 or disables at least one source line S0~S7 and the common electrode COM.

Figure 7:
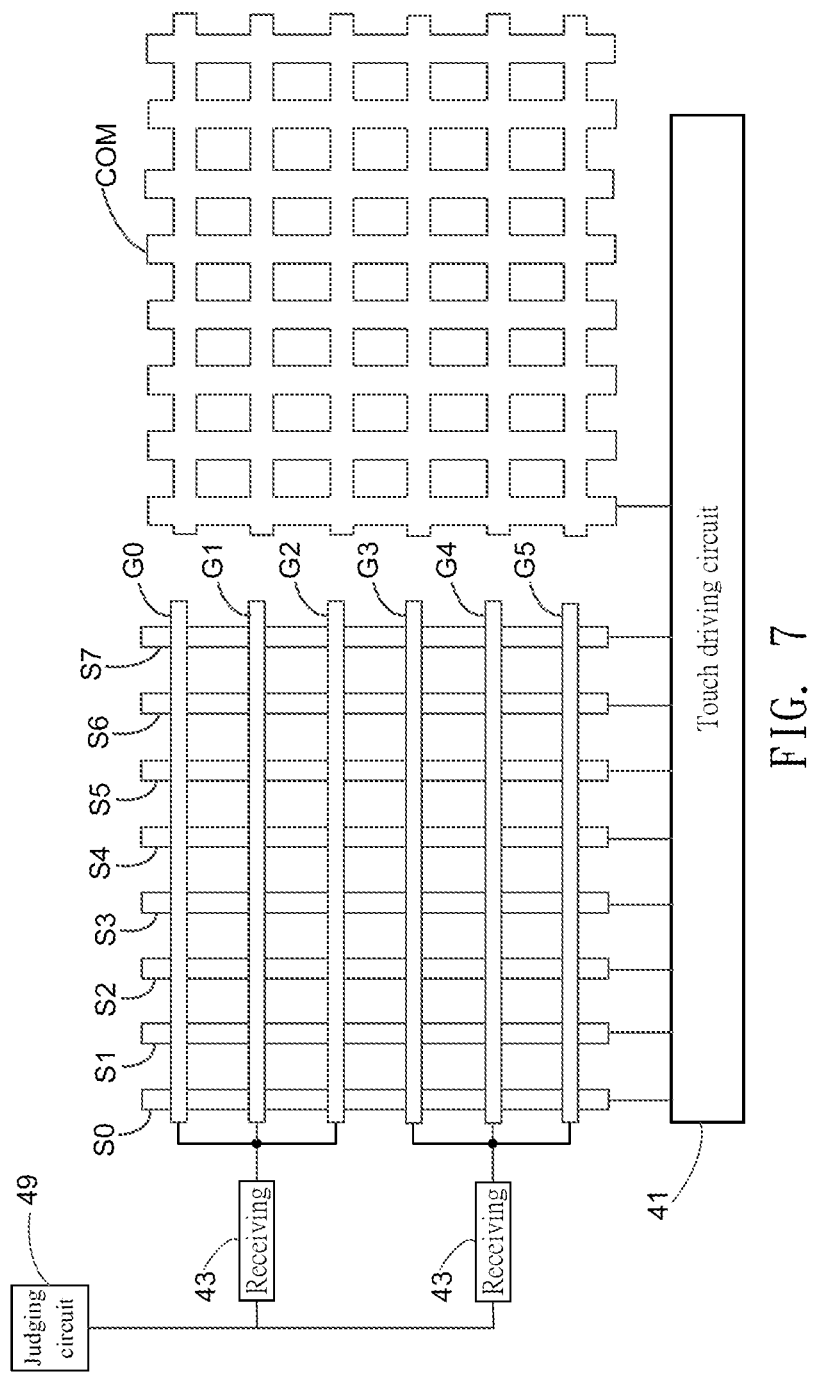
FIG. 7 shows a circuit diagram of the touch detecting circuit according to the sixth embodiment of the present invention.

Please refer to FIG. 7, which shows a circuit diagram of the touch detecting circuit according to the sixth embodiment of the present invention. As shown in the figure, the difference between the present embodiment and the one in FIG. 6 is that the present embodiment uses two source lines as a source-line group and three gate lines as a gate-line group. In the following, the embodiment in FIG. 7 is used to describe another method by which the touch detecting circuit detects the touch location. The present method is similar to the detecting method according to the embodiment in FIG. 5. According to the present method, the touch driving circuit 41 disables the common electrode COM. The touch driving circuit 41 provides the touch driving signal VCOM_TX to the first source-line group and disables the second to the fourth source-line groups. The control circuit 47 controls the receiving circuits 43 coupled to the first and the second gate-line groups to receive the first and the second gate sensing signals via the first and the second gate-line groups and transmit the first and the second gate sensing signals to the judging circuit 49 for judging if the true touched region is the intersection of the first source-line group and the first and the second gate-line groups. Next, the touch driving circuit 41 provides the touch driving signal VCOM_TX to the second source-line group and disables the rest source-line groups. The control circuit 47 controls the receiving circuits 43 coupled to the first and the second gate-line groups to receive the first and the second gate sensing signals via the first and the second gate-line groups and transmit the first and the second gate sensing signals to the judging circuit 49. Likewise, the touch driving circuit 41 provides the touch driving signal VCOM_TX to the third source-line group and disables the rest source-line groups. Then all gate sensing signals are received via all gate-line groups. Afterwards, the touch driving circuit 41 provides the touch driving signal VCOM_TX to the fourth source-line group and disables the rest source-line groups. Then all gate sensing signals are received via all gate-line groups.

Please refer to FIG. 8A and FIG. 8B, which show a cross-sectional view and a stereoscopic view of the panel according to the first embodiment of the present invention. As shown in the figures, the panel includes a gate layer 12, a source layer 14, and a common-electrode layer COML. The gate layer 12 includes the gate lines 11. The source layer 14 includes the source lines 13. The common-electrode layer COML includes the common electrode COM. The source layer 14 is located on the common-electrode layer COML. The gate layer 12 is located on the source layer 14. Besides, the panel may further include a liquid-crystal layer LC located between the source layer 14 and the common-electrode layer COML. In addition, a backlight module BL is located below the panel, namely, below the common-electrode layer COML. Since the common-electrode layer COML is located below the panel, the influence of the electrostatic shielding effect by the common electrode COM on touch detection may be avoided.

FIG. 9A and FIG. 9B show a cross-sectional view and a stereoscopic view of the panel according to the second embodiment of the present invention. As shown in the figures, the difference between the present embodiment of the previous one is that according to the present embodiment, the gate layer 12 is located on the common-electrode layer COML and the source layer 14 is located on the gate layer 12. In addition to the liquid-crystal display panels, the touch detecting circuit according to the present invention may also be applied to display panels of other types, such as organic light-emitting diode (OLED) display panels.

Those skilled in the art will readily observe that numerous modifications and alterations of the circuit and structure may be made while retaining the teachings of the invention. Accordingly, the above disclosure should be construed as limited only by the metes and bounds of the appended claims.

The invention claimed is:

1. A touch detecting circuit, comprising:
   a touch driving circuit, generating a touch driving signal, and providing said touch driving signal to at least one common electrode of a panel; and
   a touch sensing circuit, receiving a plurality of source sensing signals via a plurality of source lines of said panel, and said source sensing signals being generated corresponding to said touch driving signal;
   wherein said panel includes a gate layer, a source layer, and a common-electrode layer; said gate layer includes a plurality of gate lines; said source layer includes said source lines; said common-electrode layer includes said at least one common electrode; said gate layer and said source layer are located on the top of said common-electrode layer, said common-electrode layer is located below said panel.

2. The touch detecting circuit of claim 1, wherein said touch sensing circuit further receives a plurality of gate sensing signals via said gate lines of said panel, and said gate sensing signals are generated corresponding to said touch driving signal.

3. The touch detecting circuit of claim 2, wherein said source lines are grouped into a plurality of source-line groups; each source-line group includes at least one source line; said source-line groups include a first source-line group and a second source-line group; said gate lines are grouped into a plurality of gate-line groups; each gate-line group includes at least one gate line; said gate-line groups include a first gate-line group and a second gate-line group; in a first period, said touch driving circuit provides said touch driving signal to said common electrode, and said touch sensing circuit receives a first source sensing signal of said source sensing signals via said first source-line group and disables the rest source-line groups and said gate-line groups; and in a second period, said touch driving circuit provides said touch driving signal to said common electrode, and said touch sensing circuit receives a second source sensing signal of said source sensing signals via said second source-line group and disables the rest source-line groups and said gate-line groups.

4. The touch detecting circuit of claim 3, wherein in a third period, said touch driving circuit provides said touch driving signal to said common electrode, and said touch sensing circuit receives a first gate sensing signal of said gate sensing signals via said first gate-line group and disables the rest gate-line groups and said source-line groups; and in a fourth period, said touch driving circuit provides said touch driving signal to said common electrode, and said touch sensing circuit receives a second gate sensing signal of said gate sensing signals via said second gate-line group and disables the rest gate-line groups and said source-line groups.

5. The touch detecting circuit of claim 3, wherein said touch sensing circuit provides a direct-current level to said rest source-line groups and said gate-line groups for disabling said rest source-line groups and said gate-line groups.

6. The touch detecting circuit of claim 5, wherein said direct-current level includes a ground level.

7. The touch detecting circuit of claim 3, wherein said touch sensing circuit drives said rest source-line groups and said gate-line groups to be floating and thus disabling said rest source-line groups and said gate-line groups.

8. The touch detecting circuit of claim 3, wherein said touch sensing circuit includes a plurality of receiving circuits and at least one disabling circuit; said receiving circuits are coupled to said source-line groups and said gate-line groups for receiving said source sensing signals and said gate sensing signals; and said at least one disabling circuit is coupled to said source-line groups and said gate-line groups for disabling said rest source-line groups and said gate-line groups.

9. The touch detecting circuit of claim 2, wherein said source lines are grouped into a plurality of source-line groups; each source-line group includes at least one source line; said source-line groups include a first source-line group and a second source-line group; said gate lines are grouped into a plurality of gate-line groups; each gate-line group includes at least one gate line; said gate-line groups include a first gate-line group and a second gate-line group; in a first period, said touch driving circuit provides said touch driving signal to said common electrode; said touch sensing circuit receives a first source sensing signal of said source sensing signals via said first source-line group and a first gate sensing signal of said gate sensing signals via said first gate-line group, and disables the rest source-line groups and the rest gate-line groups; and in a second period, said touch driving circuit provides said touch driving signal to said common electrode, and said touch sensing circuit receives said first source sensing signal via said first source-line group and a second gate sensing signal of said gate sensing signals via said second gate-line group, and disables the rest source-line groups and the rest gate-line groups.

10. The touch detecting circuit of claim 9, wherein in a third period, said touch driving circuit provides said touch driving signal to said common electrode; said touch sensing circuit receives a second source sensing signal of said source sensing signals via said second source-line group and said first gate sensing signal via said first gate-line group, and disables the rest source-line groups and the rest gate-line groups; and in a fourth period, said touch driving circuit provides said touch driving signal to said common electrode, and said touch sensing circuit receives said second source sensing signal via said second source-line group and said second gate sensing signal via said second gate-line group, and disables the rest source-line groups and the rest gate-line groups.

11. The touch detecting circuit of claim 9, wherein said touch sensing circuit includes a plurality of receiving circuits and at least one disabling circuit; said receiving circuits are coupled to said source-line groups and said gate-line groups for receiving said source sensing signals and said gate sensing signals; and said at least one disabling circuit is coupled to said source-line groups and said gate-line groups for disabling said rest source-line groups and said rest gate-line groups.

12. The touch detecting circuit of claim 1, wherein said at least one common electrode includes a first common electrode and a second common electrode interlaced with said source lines; said source lines are grouped into a plurality of source-line groups; each source-line group includes at least one source line; in a first period, said touch driving circuit provides said touch driving signal to said first common electrode and disables said second common electrode, and said touch sensing circuit receives said source sensing signals via said source-line groups; and in a second period, said touch driving circuit provides said touch driving signal to said second common electrode and disables said first common electrode, and said touch sensing circuit receives said source sensing signals via said source-line groups.

13. The touch detecting circuit of claim 12, wherein said touch driving circuit provides a direct-current level to said first common electrode or said second common electrode for disabling said first common electrode or said second common electrode.

14. The touch detecting circuit of claim 13, wherein said direct-current level includes a ground level.

15. The touch detecting circuit of claim 12, wherein said touch driving circuit drives said first common electrode or said second common electrode to be floating and thus disabling said first common electrode or said second common electrode.

16. The touch detecting circuit of claim 1, wherein said gate layer is located on said source layer.

17. The touch detecting circuit of claim 1, wherein said source layer is located on said gate layer.

18. A touch detecting circuit, comprising:
   a touch driving circuit, generating a touch driving signal, providing said touch driving signal to a plurality of source-line groups of a panel, and each source-line group including at least one source line; and
   a touch sensing circuit, receiving a plurality of gate sensing signals via a plurality of gate lines of said panel, and said gate sensing signals being generated corresponding to said touch driving signal.

19. The touch detecting circuit of claim 18, wherein said source-line groups include a first source-line group and a second source-line group; each source-line group includes at least one source line; said gate lines are grouped into a plurality of gate-line groups; each gate-line group includes at least one gate line; in a first period, said touch driving circuit provides said touch driving signal to said first source-line group and disables the rest source-line groups, and said touch sensing circuit receives said gate sensing signals via said gate-line groups; and in a second period, said touch driving circuit provides said touch driving signal to said second source-line group and disables the rest source-line groups, and said touch sensing circuit receives said gate sensing signals via said gate-line groups.

20. The touch detecting circuit of claim 18, wherein said touch driving circuit is coupled to at least one common electrode of said panel for disabling said at least one common electrode.

21. The touch detecting circuit of claim 20, wherein said touch driving circuit provides a direct-current level to said common electrode for disabling said common electrode.

22. The touch detecting circuit of claim 21, wherein said direct-current level includes a ground level.

23. The touch detecting circuit of claim 20, wherein said touch driving circuit drives said common electrode to be floating for disabling said common electrode.

24. The touch detecting circuit of claim 18, wherein said panel includes a gate layer, a source layer, and a common-electrode layer; said gate layer includes said gate lines; said source layer includes said source lines; said common-electrode layer includes at least one common electrode; said source layer is located on said common-electrode layer; and said gate layer is located on said source layer.

25. The touch detecting circuit of claim 18, wherein said panel includes a gate layer, a source layer, and a common-electrode layer; said gate layer includes said gate lines; said source layer includes said source lines; said common-electrode layer includes at least one common electrode; said gate layer is located on said common-electrode layer; and said source layer is located on said gate layer.

* * * * *